March 29, 1949.   C. DIENSTBACH   2,465,957
SCANNING MIRROR NAVIGATIONAL INSTRUMENT FOR AUTOMATICALLY
AFFORDING DIRECT INDICATIONS OF THE GROUND
SPEED AND DRIFT OF AERIAL VEHICLES
Filed Sept. 22, 1945   8 Sheets-Sheet 2

CARL DIENSTBACH
INVENTOR

ATTORNEY

March 29, 1949. C. DIENSTBACH 2,465,957
SCANNING MIRROR NAVIGATIONAL INSTRUMENT FOR AUTOMATICALLY
AFFORDING DIRECT INDICATIONS OF THE GROUND
SPEED AND DRIFT OF AERIAL VEHICLES
Filed Sept. 22, 1945 8 Sheets-Sheet 3
FIG. 8.
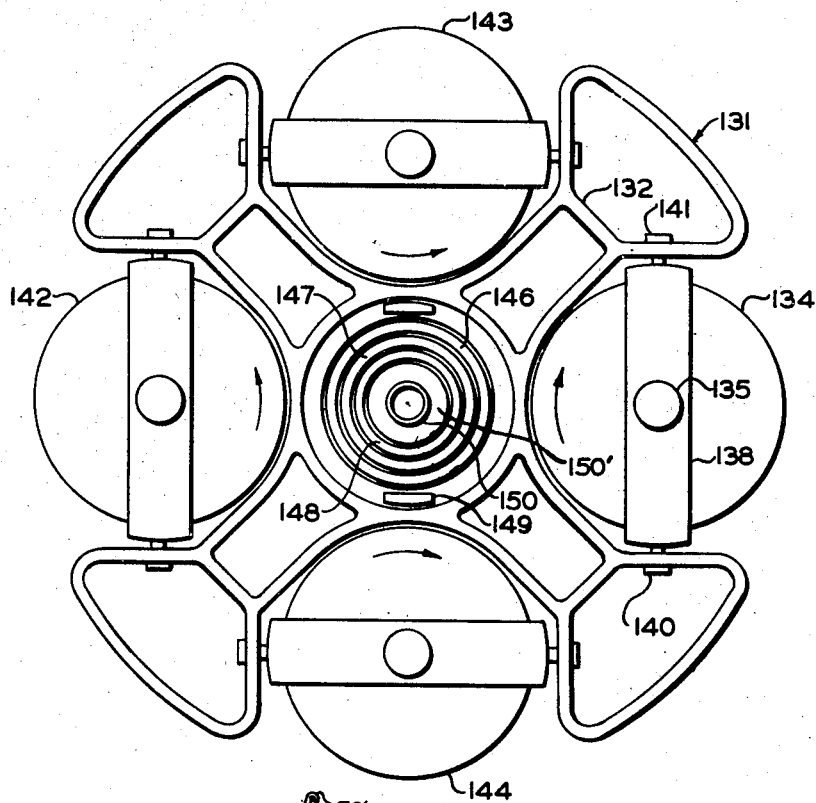
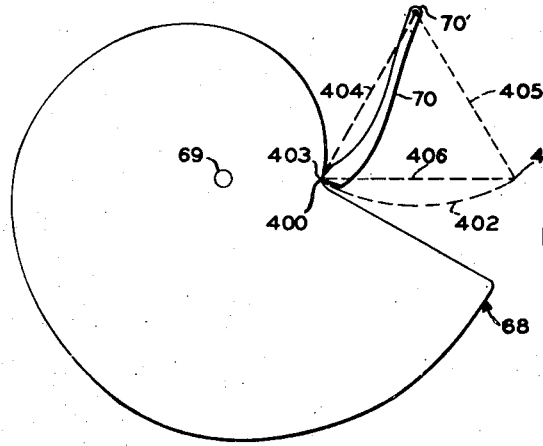
FIG. 3.
CARL DIENSTBACH
INVENTOR
ATTORNEY March 29, 1949.  C. DIENSTBACH  2,465,957
SCANNING MIRROR NAVIGATIONAL INSTRUMENT FOR AUTOMATICALLY
AFFORDING DIRECT INDICATIONS OF THE GROUND
SPEED AND DRIFT OF AERIAL VEHICLES
Filed Sept. 22, 1945  8 Sheets-Sheet 6

DIRECTION OF FLIGHT →

CARL DIENSTBACH
INVENTOR

ATTORNEY

March 29, 1949.   C. DIENSTBACH   2,465,957
SCANNING MIRROR NAVIGATIONAL INSTRUMENT FOR AUTOMATICALLY
AFFORDING DIRECT INDICATIONS OF THE GROUND
SPEED AND DRIFT OF AERIAL VEHICLES
Filed Sept. 22, 1945   8 Sheets-Sheet 7
FIG.9
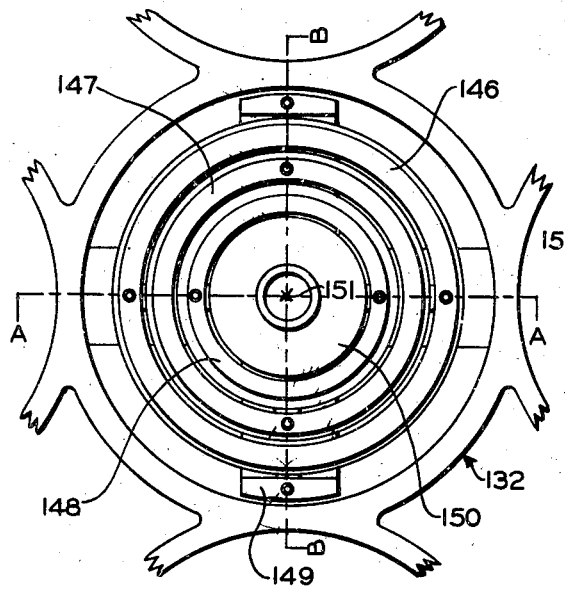
FIG.9B
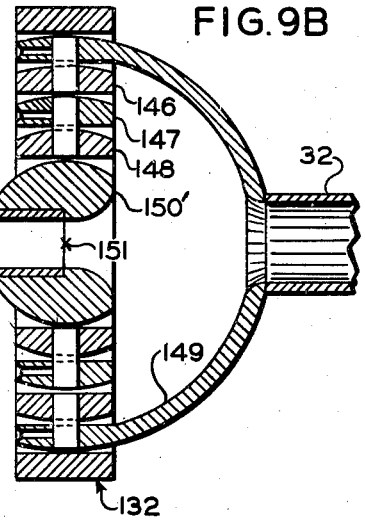
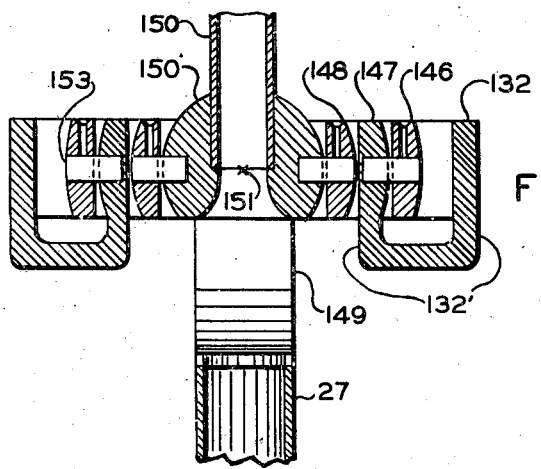
FIG.9A
CARL DIENSTBACH
INVENTOR
ATTORNEY Patented Mar. 29, 1949

2,465,957

UNITED STATES PATENT OFFICE 2,465,957

SCANNING MIRROR NAVIGATIONAL INSTRUMENT FOR AUTOMATICALLY AFFORDING DIRECT INDICATIONS OF THE GROUND SPEED AND DRIFT OF AERIAL VEHICLES

Carl Dienstbach, Long Island City, N. Y., assignor to Dienstbach Ground Speed Indicator, Inc., New York, N. Y., a corporation of New York Application September 22, 1945, Serial No. 618,038

3 Claims. (Cl. 88—1)

The present invention pertains to a navigational instrument, and more particularly to an aerial navigational instrument for indicating the true speed of an aerial vehicle, such as an airplane or a dirigible, with respect to the terrain over which such vehicle is traveling.

The device of this invention incorporates therein an additional indicator which serves to measure the lateral drift of the airplane or the like and also another indicator which serves to indicate the angle with respect to the ground at which such airplane is ascending or descending.

Certain errors and disadvantages of prior art instruments, including the need of making complex computations, have been overcome and needed time greatly shortened, by the instant invention. The instrument of this invention yields the desired information, automatically and without lengthy computations, in from five to ten seconds.

Prior art indicators of the optical type have been untrustworthy during times of poor visibility, which defect is overcome in the present invention by utilizing a temporary increase of apparent relative motion between two objects, in order more clearly ultimately to distinguish a condition of rest assumed by a virtually moving object.

By reducing the time required to collect and correlate data derived from individual sources, errors which arise from inevitably occurring temporal changes in the observed elements, are reduced to a minimum.

This instrument employs gyroscopic stabilization to overcome temporary or permanent lateral and horizontal displacements of the body of the aircraft.

Observation of the angle between a drift line and the path of a plane, hitherto used in computing drift, is often very difficult because of the frequently small angle to be observed. This instrument provides means operative in a few seconds to compensate for the drift of the plane and at the same time to exaggerate the small angle just referred to, by the aid of a moving mirror, so that small angles of drift may be more readily observed.

In the art of aerial navigation there has been encountered great difficulty in providing an instrument which will give an instantaneous reading of the angle of climb or descent, as distinguished from the rate of climb, integrated over a comparative extensive length of time.

The navigational instrument of the present invention serves entirely independently of any determination other than that arising from the stabilization of an optical image.

In the instrument of the present invention, a moving optical device, such as a mirror or a prism, is employed to scan the ground beneath the aircraft. The scanning is brought about by imparting to the optical device angular motion about an axis which is fixed with respect to the course of the aircraft. Since the scanned area is undergoing a substantially uniform rectilinear speed with respect to the aircraft, it is necessary that the angular speed of the scanning optical device be varied according to the instantaneous angle existing between the scanner and the ground. Manifestly such speed alterations cannot be brought about by manual adjustments of the scanning speed, so that there has been incorporated in the instrument of the present invention devices for automatically and continuously altering the instantaneous angular velocity of the scanning optical device according to a predetermined mathematical relationship between the angle of the scanner with respect to the ground at a given instant and such angular velocity.

The navigational instrument of this invention incorporates a scanner having a variable rate of scanning and gives ultimate indications of ground speed by adjusting the rate of scanning until a given null effect is obtained. The variation of scanning speed is accomplished by an electrical device so that the frequency adjustment will control the indication of the ground speed. Such frequency adjustment is made upon a scale directly graduated in any desired unit of ground speed.

Another object of this invention is to provide a ground speed indicator for airplanes, which embodies a simple and inexpensive mechanism and in which, after initial adjustments have been made, the operation of a single control will suffice to give the desired indication, thus eliminating the necessity for the more or less continuous manual regulation needed in the case of such instruments of the prior art.

Another object of this invention is to magnify indications in an optical ground speed indication by contrasting motion and rest of an optical image.

Yet another object of this invention is to provide a ground speed indicator having a direct reading chart upon which the speed of the airplane with respect to the ground may be directly read, without the necessity of intermediate computations which latter are time consuming, and therefore may involve an element of great risk, especially in warfare, in view of the relatively great distances traversed by an airplane within a small fraction of a minute.

Still another object of this invention is to provide an instrument of the type described in which the adjustments made incidental to securing the correct performance of the instrument as a ground speed indicator, will at the same time yield, upon suitable scales, visual indications of the lateral drift of the airplane and of the angle at which it is climbing or descending.

Yet another purpose of this invention is to provide a ground speed indicator employing optical scanning, in which the levelling adjustments needed to maintain a predetermined relationship between the scanning device and the ground, and the adjustments of angle between the axis of the indicator and the horizontal direction will simultaneously and automatically indicate the lateral drift and the rate of climb of an airplane.

An additional object of this invention is to provide a drift indicator in which optical scanning is employed in order to exaggerate the apparent angle of drift, with a consequent very great increase in accuracy.

A further purpose of this invention is to provide a ground speed indicator employing a scanning mirror driven by an electric motor, and to incorporate gear-shifting devices in the instrument, so that the mirror speed may be varied over an extremely wide range of values, while the speed of the driving motor is kept within much narrower limits of variation.

A still additional object of the instant invention is to provide, in an optical aerial navigational instrument of the type employing as a null indication observation of the motion of an optical image with respect to the observer's field of vision, an ancillary checking device which will serve to create inevitable motion of an object across the optical field of the instrument, when, due to low visibility or other unfavorable circumstances, the observer is unable clearly to determine whether or not movement is taking place within the visual field exhibited at the eye-piece of the instrument.

This invention additionally has as one of the purposes thereof, the provision of an aircraft navigational instrument serving to yield data with respect to ground speed, lateral drift and angle of climb, which shall be relatively simple and cheap to construct, shall be capable of ready installation in existing aircraft, shall be compact, rugged and of relatively light weight, while at the same time making relatively slight demands upon the electric power of the aircraft, for operation of the driving motor of the instrument, which shall be capable of easy and rapid manipulation by the navigator without the necessity for extensive preliminary training in the employment thereof, and which shall be relatively free from liability of mechanical or electrical breakdown, or serious deviation from accuracy of indications.

This invention broadly includes, all mounted upon the vehicle itself, a ground scanning mirror of the reciprocating oscillatory type, an optical arrangement for viewing a ground image reflected in the mirror, a mirror driving mechanism of the variable speed type, a speed adjusting and indicating mechanism, and a translating device showing the indications of the speed adjusting device directly in terms of linear ground speed. The angular speed of the mirror is made to conform to the varying angle, with respect to the observer, of the observed object, as the vehicle approaches, passes, and recedes from the object, by a suitable device such as a driving cam having a contour affording the desired speed variation, and any suitable arrangement may be employed to impart the desired reciprocating oscillatory motion to the mirror, such as a portion of the same cam used to cause angular speed variations of the mirror.

Additionally, this invention includes compensatory adjusting mechanisms giving visual indications of the angle of climb and of the lateral drift, together with a checking device for use under conditions of low visibility, whereby the accuracy of determination of an optically observed null point is greatly enhanced.

Other purposes and advantages of this invention will be apparent to those skilled in the art of which this invention pertains.

In the drawings:

Fig. 3 is a partly geometrical diagram, illustrating one form of cam and the operating characteristics of this cam as used in the device of this invention.

Fig. 8 is a plan view of a gyroscope, showing a universal joint for supporting portions of this instrument.

Fig. 9 is a partial detail view of the gyroscopic mounting, enlarged.

Figs. 9A and 9B show in section details of the mounting of Fig. 9, on the lines A—A and B—B, respectively.

Figure 1:
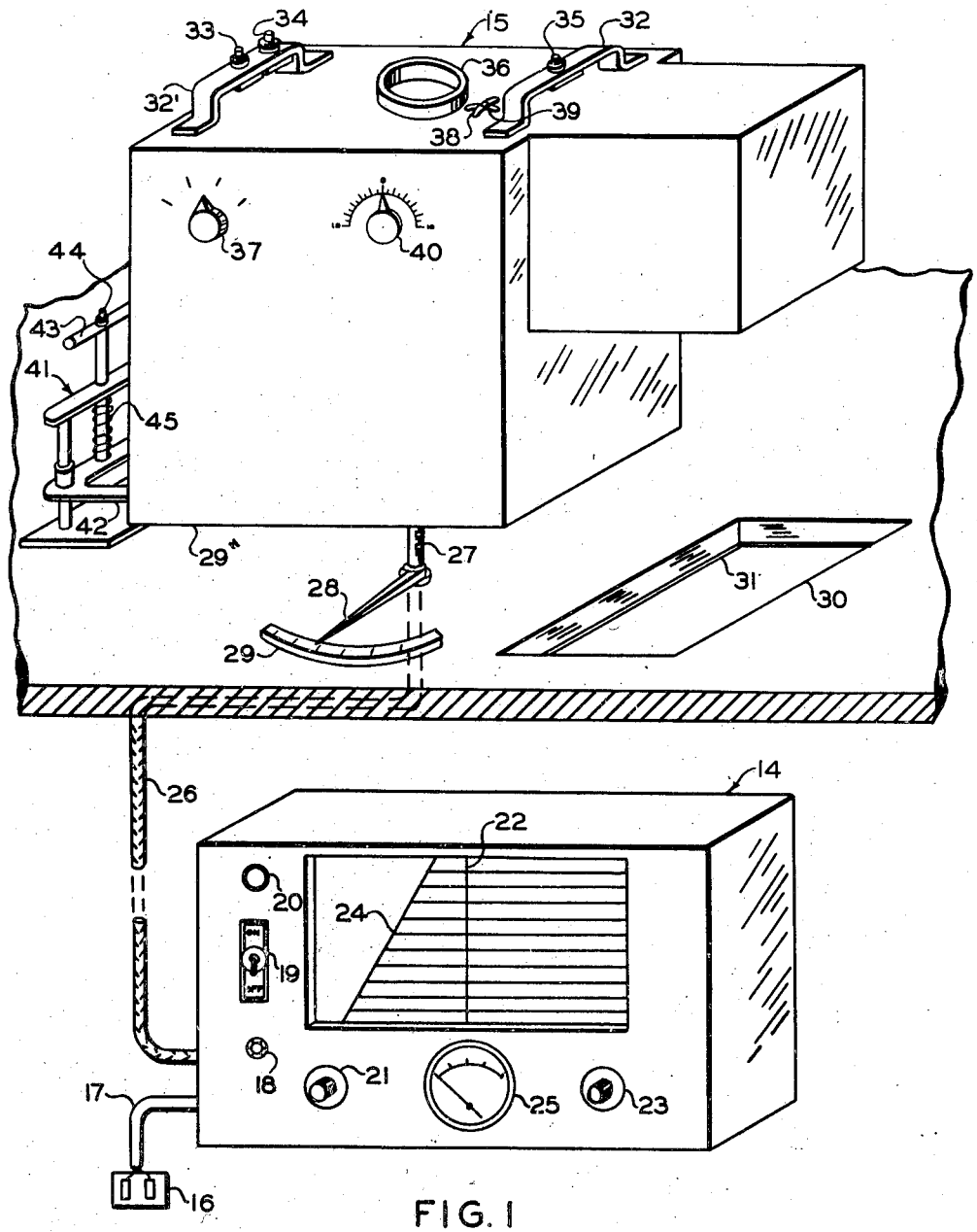
Fig. 1 is a perspective view of one embodiment of this invention.

Fig. 1 illustrates one form of the ground speed indicator consisting of two units, the control unit 14 and the instrument 15. A suitable source of electrical power for the operation of the device connects to terminal 16 and thence, through power cable 17, to control unit 14.

Control unit 14 is provided with a suitable line fuse mounted in fuse holder 18, off-on switch 19, off-on indicating light 20, direct reading control knob 21 connecting internally to dial pointer 22, as well as to a power type of variable frequency generator (not shown) and a zero adjustment control knob 23, which latter operates a cam adjustment in the unit, for proper calibration. The pointer 22 moves along the direct reading ground speed altitude chart 24. The control unit also includes a frequency meter 25.

A multiple conductor cable 26 connects the control unit 14 to the instrument 15 and extends through the pivotal supporting post 27 upon which the instrument is rotatably mounted. Pivotal post 27 allows the instrument to be rotated approximately 30 degrees each way from a center point, and is provided with a pointer 28 and a scale 29, which latter is calibrated in angular degrees, allowing the observer to make a direct reading of the amount of drift of the airplane, as will be later explained.

The instrument is housed in a cubical box-like protecting cover 29 having a projection on one side, this projection having an aperture on its under side (not shown) so placed so that it is directly over an opening 30 in the floor of an airplane. This opening is preferably provided with a transparent plastic piece 31 placed at its lower edge, to keep out air currents when the plane, upon which the instrument is carried, is in flight.

The instrument is provided with two handles 32 and 32' on which are mounted switches 33, 34, and 35, the operation of which latter will be later described. Also included are the eyepiece 36, motor gear shift control 37, level indicators 38 and 39, and level adjustment control 40.

When the instrument is not in use, it is held rigidly in a level position with respect to the floor of the airplane by a clamping device 41. The clamping device consists of a locking member 42, which is pulled up under the instrument by the hand lever 43. When the instrument is in use, the locking member 42 is lowered by pressing the release pin 44 so that a spring 45 causes the locking member 42 to be forced instantly to the floor level, thereby allowing the indicating unit 15 to pivot in all directions on the supporting post 27, details of which latter will be later described.

Figure 2:
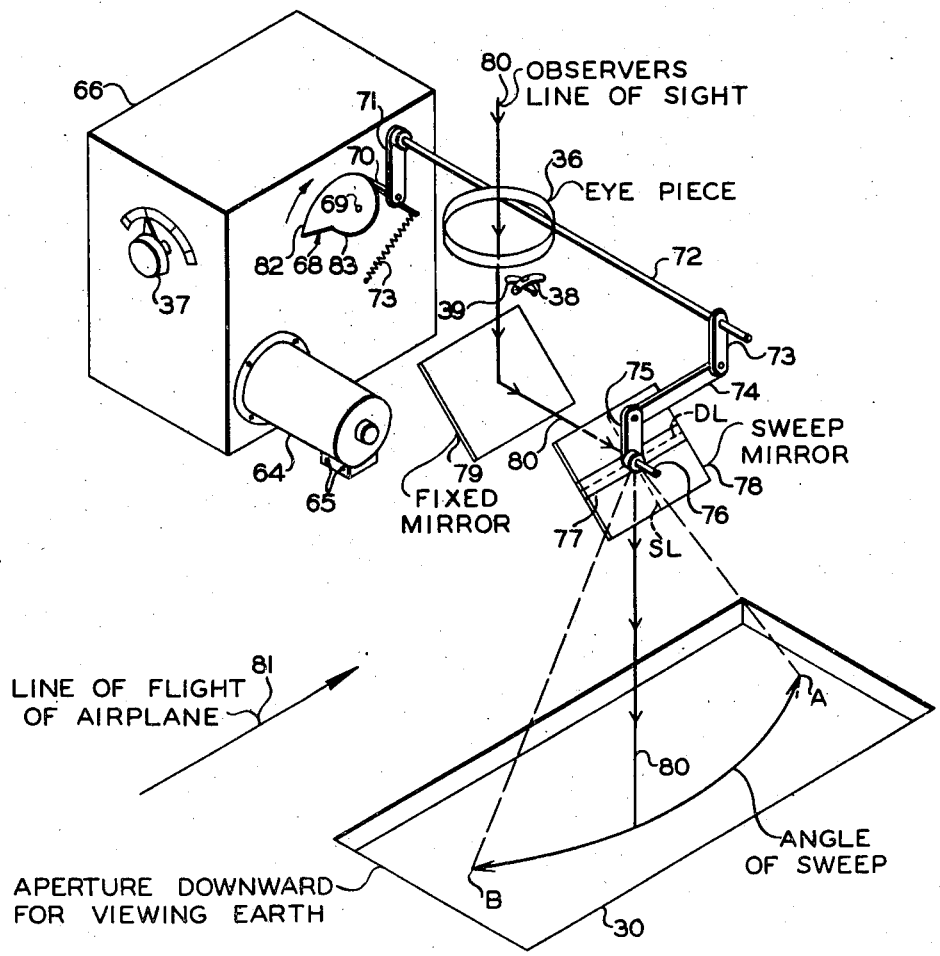
Fig. 2 is a detailed perspective view of a portion of the interior of the instrument of Fig. 1, illustrating the optical action thereof.

Fig. 2 is a diagrammatic representation of the interior of the indicating unit, showing the various details of the mirrors and sweep device employed.

The electric motor 64 is provided with terminals 65 which are connected to the electrical circuit in a manner to be later described. The motor 64 is coupled to a gear box 66 consisting of a series of reduction gears and an automatic clutch arrangement with a gear shift control 37, in this instance allowing four separate speeds for the rotation of cam 68, this cam being attached to shaft 69, which projects from the gear box 66. The gear shift control knob 37 extends through the protecting cover of the indicating unit 15, previously described in connection with Fig. 1.

A cam riding pin 70 is fastened to lever 71 which latter is in turn attached to shaft 72. Spring 73 provides the necessary tension so that the cam riding pin 70 rides firmly on the cam 68. On the opposite end of shaft 72 from lever 71 there is attached lever 73', to which latter in turn is attached lever 74. Lever 74 is pivotally attached to lever 75, which latter is connected to shaft 76. Clamp 77 is also attached to shaft 76 and holds the sweep mirror 78 in position. It is to be understood that both shaft 72 and shaft 76 are supported on suitable bearings (not shown).

Also indicated in Fig. 2 are two spirit levels 38 and 39, at tight angles to each other and with level 39 placed directly under lever 38, so that when an observer looks directly down on the levels he can see when the air bubbles of both levels indicate a level position of the instrument.

Eye-piece 36 is shown directly above the fixed mirror 79, which latter is set at an angle of 45 degrees with respect to the top edge of the eye-piece 36, thus allowing the observer's line of sight, indicated by line 80, to pass directly downward from eye-piece 36, then at right angles from fixed mirror 79 to sweep mirror 78, and thence downward again until it passes through the opening 38 in the floor of the airplane, to view the ground therebeneath.

The line of flight of the airplane is indicated by the arrow 81 and the clockwise rotation of cam 68 acting on cam-riding pin 70, and the levers previously described, causes sweep mirror 78 to traverse through an angle from A to B.

As point 82 on cam 68 passes the cam-riding pin 70, spring 73 pulls lever 71 back to where it rests on position 83 of cam 68. This movement, transmitted through the shaft and lever arrangement described above, causes sweep mirror 78 to snap back to its initial position A on the angle of sweep, whence the sweep operation at once starts over again, by the repetitive actuation, due to the shape of cam 68.

Reference is now made to Fig. 3, where cam 68 is shown in detail. This cam is affixed to shaft 69, so that, upon the rotation of this shaft, lever 70, pivoted at 70', will be made to describe a curve between points 400 and 401, over the arc represented by the dotted line 402. Lever 70 comes down to a knife edge 403, which latter rides directly on the surface of the cam. Considering point 70' as a center, the arc 402 subtends an angle delimited by the lines 404—405, the chord of arc 402 being shown by the dotted line 406.

The design of the cam 68 takes into consideration the fact that when a fast-moving body approaches a stationary object laterally, the apparent motion of this object is at first slow, but increases gradually, until it reaches its highest speed, when the moving body and the stationary object are closest to one another. The moment the moving body has passed the stationary object, the apparent motion of the latter decreases in the same proportion as it increased before. If this stationary object is sighted in a mirror, its apparent path across the mirror forms a straight line. Both motions above mentioned have uniform speed. It is, therefore, necessary to impart the apparent accelerating and decelerating motions of the object to a viewing mirror in such a way that the sweep of the latter corresponds with the accelerating and decelerating motions above mentioned. The cam 68 is designed with this problem in mind, and Fig. 3 represents one shape of the cam which may be used for securing the results desired.

Figure 4:
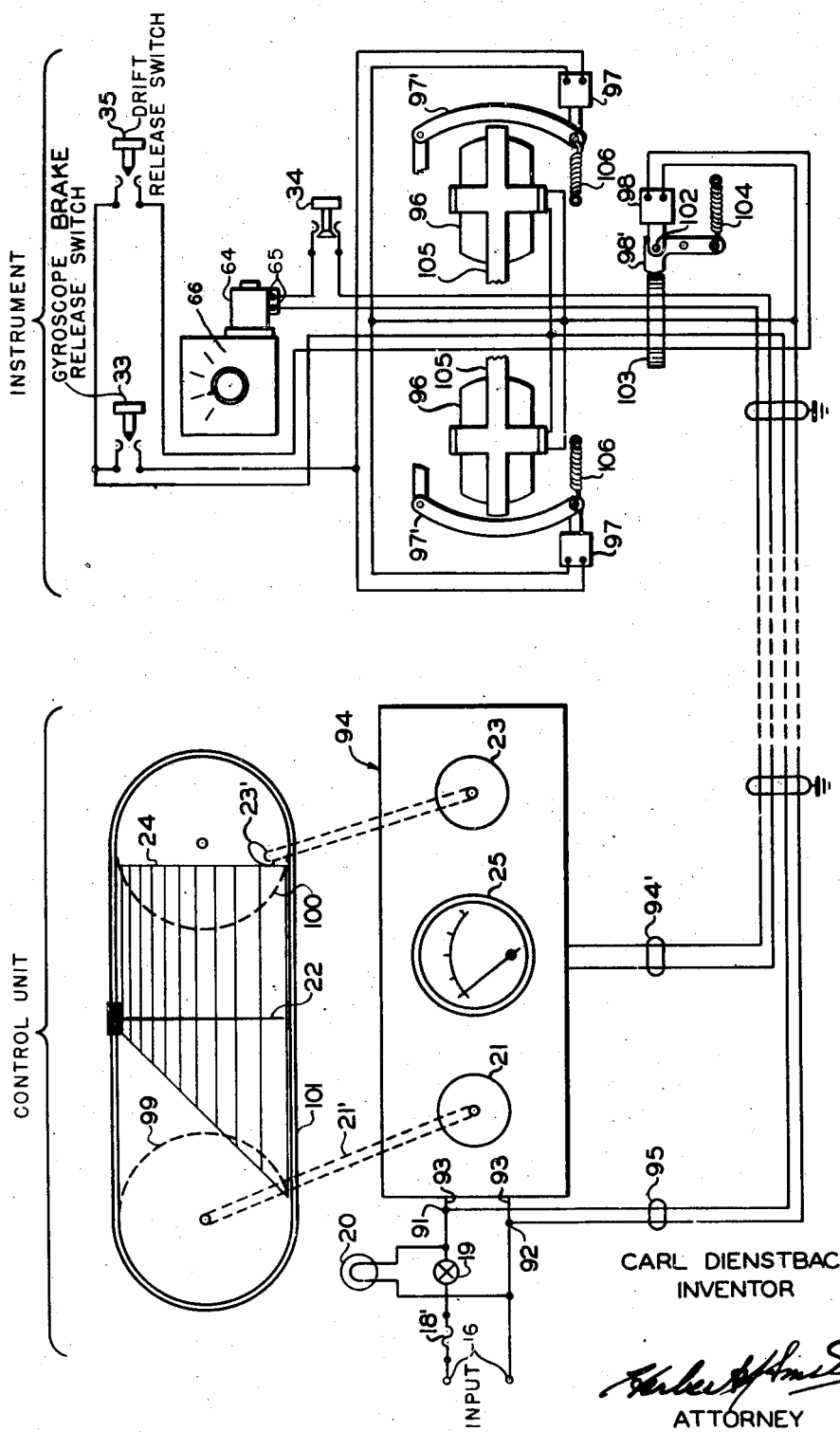
Fig. 4 shows partly schematically, the electrical control and operating circuits of this invention.

The schematic wiring diagram of the control unit and instrument is illustrated in Fig. 4. Input terminals 16 are connected to the airplane electrical power supply, such as a 24-volt supply commonly employed thereupon. However, any type of airplane power supply may be employed, providing the above-described equipment is adapted for the voltage and other characteristics of the current afforded by such supply.

Input terminals 16 connect through circuit fuse 18', and there is also provided an on-off switch 19 and an on-off indicating light 20. At terminals 91 and 92 the circuit is divided, connecting through conductors 93 to any suitable power type of variable frequency generator 94. This generator 94 provides the necessary power, at a variable frequency, to operate a synchronous electric motor 64, so that the speed of the sweep mirror 78 (Fig. 2) can be controlled at will by the observer, as will later be described. Suitable conductors connect terminals 65 of the sweep motor 64 with the quick-release switch 34 so connected that the motor can be stopped independently of the other equipment.

Conductors 95 connect the airplane power supply circuit to a group of gyroscope motors, such as gyroscope motor 96, and through gyroscope brake release switch 33 to gyroscope brake release solenoids, such as solenoid 97. Conductors 95 also connect through drift release switch 35 to solenoid 98. Brake lever 98', pivoting on pivot 102, is normally held against brake drum 103 because of the tension provided by spring 104. When the operator presses drift release switch 35, solenoid 98 is energized, causing lever 98' to release from brake drum 103, thus allowing the operator to rotate the instrument for the purpose of guiding the flow of the object along the drift line of the mirror.

The variable frequency generator 94 provides a variation of the frequency of the power applied to the sweep motor 64 in a ratio of from 1 to 8, for example, and consists of an electronic type of audio frequency oscillator coupled to a power amplifier having sufficient output to operate the synchronous sweep motor 64. By means of the control knob 21, which controls the frequency adjustment of the generator 94, the operator is able to control the sweep motor speed as desired. Control knob 21 is also connected by means of connecting shaft 21' to the dial arrangement consisting of wheels 99 and 100 on which rotates an endless belt 101. Dial pointer 22 is attached to belt 101, so that, as the operator rotates control knob 21 to vary the frequency, pointer 22 slides along the direct reading chart 24.

The frequency indicating meter 25 is provided as a means of checking the frequency calibration of the instrument and control knob 23 connects to cam 23' to provide a "zero adjustment" or correction for the direct reading chart.

When the gyroscope brake release switch 33 is pressed, solenoids, such as 97, are energized, thereby releasing the gyroscope brakes, such as 97', which latter is normally held against gyroscope frame 105 by means of spring 106. This action allows the operator to adjust the instrument to make a ground speed reading, as will later be described in detail.

Figure 5:
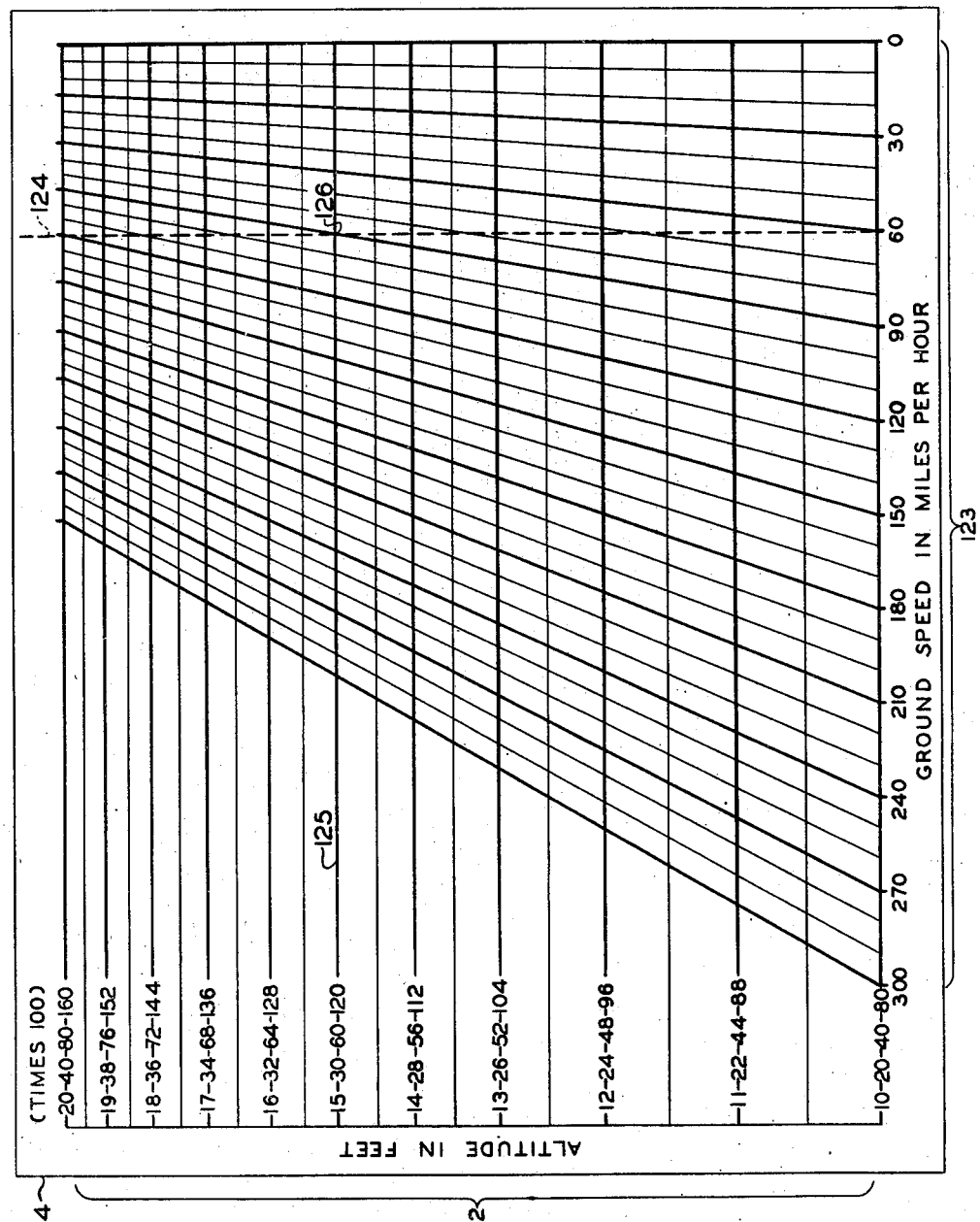
Fig. 5 illustrates a direct reading chart forming part of this invention.

Fig. 5 is a detailed view of the direct reading chart 24, employed on the control unit 14 of Fig. 1. The vertical pointer or indicator, 22, shown in Fig. 1, moves to the right or left along the chart 24. The vertical calibration embraced by bracket 122, Fig. 5, on the chart 24 indicates the altitude in hundreds of feet, and the horizontal calibration embraced by bracket 123 indicates the ground speed in miles per hour. Altitude has four scales each corresponding to a setting of the gears in gear box 66 (Figs. 2 and 4).

The pointer moves across the chart 24 and is stopped when a point on the ground appears to be stationary or not moving as optically observed on the instrument, as will be later described. By reading the chart at the proper altitude calibration, which is the altitude at which the airplane is flying, the pointer will directly indicate the ground speed of the airplane in miles per hour.

As an example, if the airplane is flying at a 6,000 foot altitude as determined by conventional means, and the ground is made to appear stationary in the optical system, and the pointer then occupies the position shown by dotted line 124, the intersection of this dotted line with the 6,000 foot altitude line 125, indicated at the point 126, indicates on the horizontal scale 123 that the actual ground speed is 90 miles per hour, by following downwardly the angular heavy solid line, from intersection 126, to the scale embraced by bracket 123.

Figure 6:
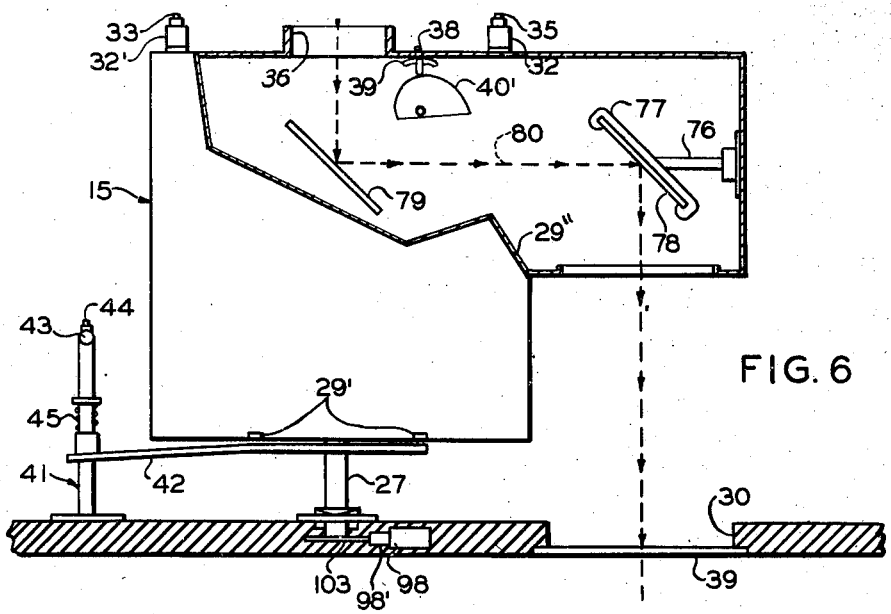
Fig. 6 is a partly sectional side elevation of one portion of the instrument shown in Fig. 1.

Fig. 6 is an irregular partly sectional view of the instrument 15 as normally seen from the operator's position, showing part of the cover 29 cut away. The line-of-sight indicated by dotted line 80 extends downward through the eyepiece 36 where it is reflected at right angles by fixed mirror 79 and thence reflected downward by sweep mirror 78 through the aperture 30 in the floor of the airplane. Sweep mirror 78 is indicated held by clamp 77, which latter is in turn fastened to movable shaft 76.

This figure also shows the position of handles 41 and 42, with their respective brake release switches. The clamping device 41 is indicated in the position which is assumed when the instrument is not in use, and the locking member 42 is shown extending under the instrument, so that it contacts the braces 29', attached to the protecting cover 29. The hand lever 43 and release lever 44 are indicated in the locking position, with spring 45 compressed so that when release lever 44 is pressed, locking member 42 will disengage the braces 29'.

This figure also shows the drift release solenoid 98, release lever 98', and round brake drum member 103 attached to the base of the pivoted supporting member 27. Lever adjustment cam 40' is indicated below the level 38, and is described in detail in reference to Fig. 7.

Figure 7:
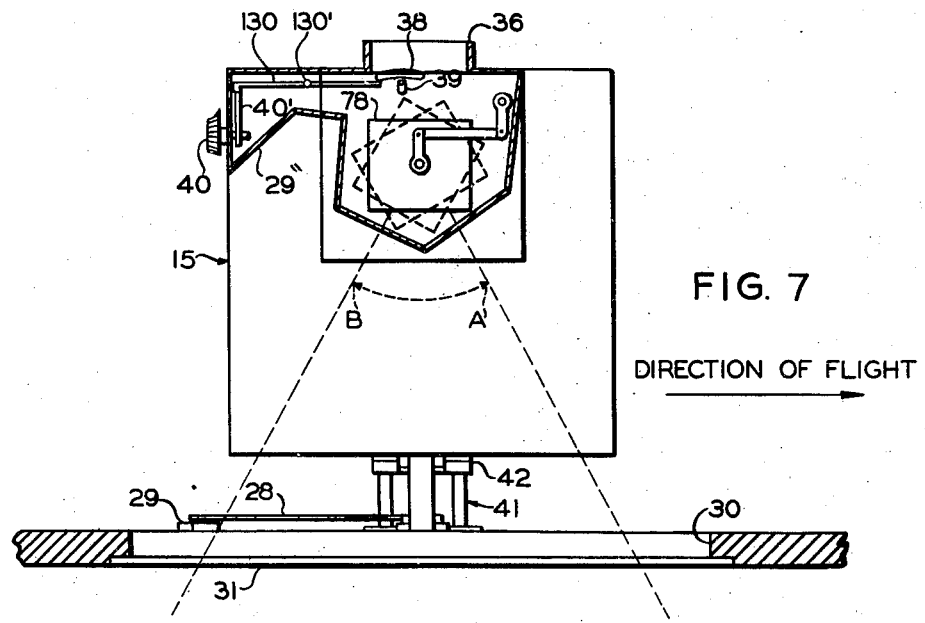
Fig. 7 is a partly sectional end elevation side view of the portion of the instrument shown in Fig. 6.

Fig. 7 is an irregular partly sectional side view of the instrument 15, with part of the cover 29 cut away to indicate the position of the sweep mirror 78, and showing the angle of sweep represented by arc AB. The opening 30 in the floor of the airplane is preferably covered by a transparent piece 31, of plastic or other suitable material.

Level adjustment control 40 is attached to level adjustment cam 40', and rides against lever 130, which latter is pivoted at 130', resulting in a movement of spirit level 38, for the purpose of indicating the angle of climb or descent of the airplane. Spirit level 39 is indicated directly under, and at right angles to, spirit level 38, so that the operator can check both levels at the same time when making a ground speed observation. Spirit level 39 is of such size that its air bubble will be covered by level 38 when the instrument is level laterally but will be observed on either side of level 38 should the instrument be moved to a substantial degree.

An end view of the locking member 42, extending from clamping device 41, is presented, as well as a side view of the drift indicator pointer 28 and drift scale 29, previously described in connection with Fig. 1.

Fig. 8 is a view of the gyroscopic stabilizer 131 employed in the instrument and used while making a ground speed or drift observation. The gyroscopic stabilizer 131 consists of a light but rigid web-like frame 132 upon which are held four electrically operated gyroscopes such as shown at 134. Each of the gyroscopes such as 134 revolves on bearings such as 135, the bearings such as 135 being mounted on concentric rings such as 138, which latter are in turn free to revolve on pivot bearings, such as shown at 140 and 141.

Opposite pairs of gyroscopes, such as shown at 134 and 142 revolve in opposite directions, and in the same plane as indicated by the arrows. Consequently the respective precession is also in opposite directions, while the respective stabilizing effects are in a single direction only.

These stabilizing effects are also in the same plane, and the suspension of each pair of gyroscopes, such as 134 and 142, is arranged in such a way that their precession is at right angles to the opposite pair of gyroscopes, 143 and 144.

At every deviation of the object to be stabilized, in this instance the ground speed instrument 15, either pair of gyroscopes rotate around one of the two stabilizing axes, or if the deviation has two components of various or equal magnitudes, each of which rotates around one of these two stabilizing axes, every deviation encounters a resistance represented by a constant force. This is true because any deviation around one of these axes is counteracted by two gyroscopes only, while any deviation around any other axis is counteracted by four gyroscopes.

If only two gyroscopes counteract one another, each one acts with its full stabilizing effect. If all four are counteracting each other, each one acts with only a part of its stabilizing effect, the sum of all these stabilizing effects being a constant. If the axis of deviation is exactly diagonal to the original stabilizing axes, all four gyroscopes act against this deviation. However, in this case, each gyroscope acts with only half of its stabilizing effect.

If the axis of deviation be nearer one of the original stabilizing axes, it will encounter more than one half of the effect of the axis nearest to it, but proportionally less than half of the effect of the axis which is farther away from it. In this way the sum of the stabilizing effects around any axis remains a constant.

A series of concentric rings 146, 147, 148 and 150', fastened together with alternate pairs of pivotal bearings connect an outer yoke member 149 to an inner support member 150, the gyroscope mounting web frame 132 connecting to ring 147. The gimbal arrangement of pivoting is conventional, generally.

In Fig. 9 is shown a detail view of the gimbal rings, disclosed in Fig. 8. All the elements in Fig. 9 bear identical reference numerals with those found in Fig. 8. The additional point 151 denotes the point of space constituting the exact center of rotation of all the elements which are capable of motion inter se, or with respect to the axis of the gyroscope as a whole.

Fig. 9A is a cross section taken along the lines A—A of Fig. 9, all elements thereof being identified by the same reference numerals as used in Figs. 8 and 9. In this figure, there is additionally seen the tubular shaft 27, which serves as the instrument support, as shown in Fig. 1.

In Fig. 9B is shown a cross section of Fig. 9 along the line B—B, all elements here shown being numbered to correspond with Figs. 8 and 9.

Figure 10:
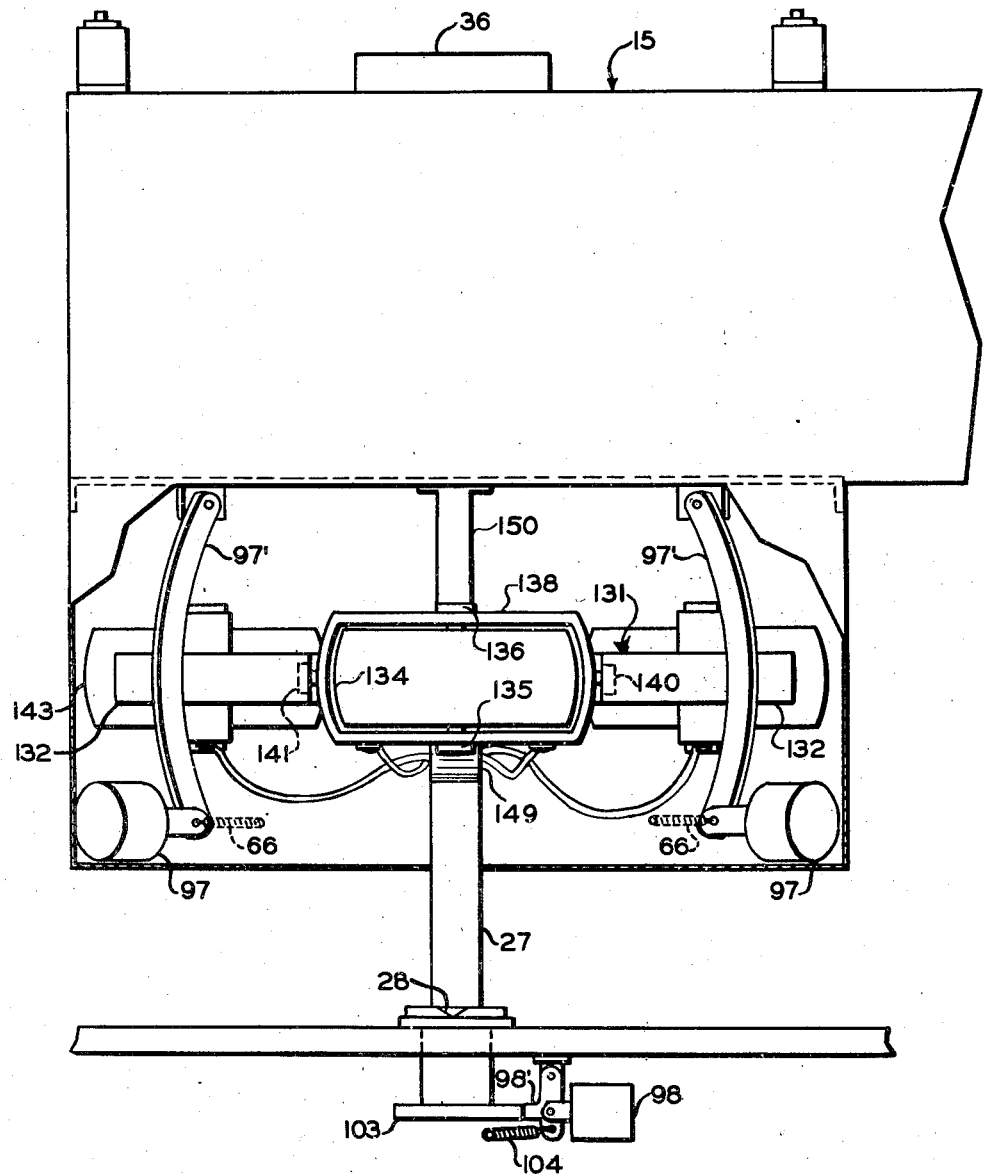
Fig. 10 is a detail view of a portion of the complete assembly, including the gyroscopic mounting of Fig. 9, showing the brakes used therewith.

Fig. 10 is a partly cut away view of the instrument assembly 15 of Fig. 1, parts of the case 29 having been removed. The elements here shown, have already been shown and described in Figs. 1, 4, 8, 9, 9A and 9B, so that detailed further description thereof is thought unnecessary. This figure more clearly shows the manner in which the brake mechanisms 97', 97' are actuated by solenoids 97, 97, and makes clear the manner in which the gyroscope can be brought into any desired position by rotation in all directions about central point 151 (Fig. 9).

The manner in which the instrument and system of this invention operate will now be described, reference being especially made to Figs. 1, 2, 4, and 7.

The instrument is put into operative condition by closing switch 19, so that the gyroscopes start rotating and the audio generator 94 is set into operation. When the gyroscopes have come up to speed and when the output of the audio generator has become stable, the operator releases clamp 41 by pressure upon mechanical release button 44, thus causing elements 42 to drop away from the instrument proper and allowing the latter to pivot freely in the gimbal rings. The airplane is put into level flight and the operator determines the altitude thereof by any convenient manner, such as the conventional altimeter. He then sets gear shift lever 37 to the proper range, suiting the altitude found.

Frequency control 21 is adjusted simultaneously with control 23, so that meter 25 of dial scale 24 gives coordinated readings.

The operator then presses control button 33, thereby releasing the gyroscope brakes, via the switching mechanism; then the spirit levels indicate and allow box 15 to be adjusted to a true horizontal position. The button 33 is then released and thereafter the gyroscopes act to keep the instrument level for a length of time sufficient for the desired readings to be secured.

The operator looks through eye-piece 36 and views therethrough any convenient point of the terrain over which the airplane is flying, as the sweep mirror 78 starts to execute a sweep stroke. Any drift effect is compensated by rotation of the instrument about shaft 27, until the ground images appear to travel in horizontal lines. The indication thus given by point 28 upon scale 29 shows the true flight course of the airplane.

The operator then adjusts speed control 21 until the proper speed of sweep mirror 78 is secured. This point is determined when the object selected as the point of reference upon the underlying terrain appears to stand still, when viewed through eye-piece 36. The ground speed of the airplane may then be read directly upon chart 24, as already described in detail in the description of Fig. 5.

Under conditions of poor visibility, slow movements of the ground image may be difficult to determine. Under such conditions, the operator utilizes control button 34 to bring about the temporary stopping of the drive mechanism actuating sweep mirror 78. The release of control button 34 allows the sweep mirror to again operate at the proper speed needed to cause the selected image upon the underlying terrain to appear to stand still. This procedure causes rate of apparent motion to be greatly increased, although momentarily. This facilitates determination of apparent motion in a poorly lighted field of vision, as well-known in the optical art.

The eye-piece 36 is shown having an opening therein, but the opening may contain a grid similar to a conventional gun sight so that one can center the eye with the intersection of the drift line DL, and the sight line SL, shown dotted, on the front of the sweep mirror 78 for accuracy in determining when the earth or object is apparently stationary.

It is pointed out that solenoids 97 are designed so that they act as counterbalances to properly balance the gyroscope unit. The box 15 is also centrally balanced in a conventional manner so that the entire instrument is balanced at point 151.

Summarily, for the following preliminary operations, the airplane should be in level flight:

First, switch 19 is turned on, lighting the pilot light 22 and setting the gyroscopes in motion. Then the audio generator in box 14 is put in operation. When the gyroscopes have reached their operational speed, button 44 is pressed to release clamp 41, which connects the entire instrument rigidly with the airplane. Then take hold of the handles 32—32', resting thumb of left hand on button 33. Wait for steady air conditions, then press button 33, thereby releasing box 15 from the gyroscopic control and then pivot box 15 around center point 151 (Figure 9A) until bubbles of levels 38 and 39 coincide momentarily. At this very instant release button 33, causing box 15 to be again solidly attached to the gyroscopic unit. Then frequency control 23 has to be adjusted to stabilize audio frequency meter 25. After these preliminary operations, the instrument is ready for use.

When looking through the eye-piece 36 while the motor 64 (Fig. 2) which actuates the oscillating mirror 78, has not yet been started, the image of the ground may be seen moving across said mirror. By pressing drift release button 35, the instrument now may be adjusted around its vertical axis in such a way that the image of a selected object on the ground moves along the drift line of the mirror 78. After this adjustment is completed, the gear control knob 37 is set according to the known altitude, and the motor 64 is started by switch button 34, causing the mirror 78 to oscillate. When the mirror oscillations are properly controlled by increasing the speed of motor 64 through vernier control 21, the motion of the object on the ground is stopped across the sight line. At this moment the ground speed in miles per hour may be seen on the chart 24 for any given altitude of flight.

It sometimes happens, that after the motion of the image is stopped in the described manner, that it actually is moving slowly in a direction which is at right angles with the drift line of mirror 78. In this case a slight readjustment of the instrument is necessary, by means of pressing drift release button 35 and turning the instrument into the necessary direction. The angle of drift is recorded by drift indicator 28. These fine adjustments result in a more exact indication of the angle of drift than has been possible heretofore.

There are also occasions, when the motion of the image cannot be stopped across the sightline by the procedure described above. This indicates that the direction of flight of the airplane is not horizontal. In order to make the necessary adjustment, box 15 has to be released again (by pressing button 33) from the gyroscope unit, as described above. Then it is turned around its transversal axis 27 until the desired effect is reached, that is, until the motion of the image is stopped. Because of this operation the bubble of spirit level 38 has been put out of alignment with that of level 39. Therefore, it has to be brought into its proper position by turning adjustment knob 40. By this operation the pointer of the knob indicates the angle of either ascent or descent on the calibrated dial, associated with knob 40.

While I have shown and described certain embodiments of this invention, many variations thereof will be apparent to those skilled in the art. Accordingly, the invention is only limited by the scope of the hereunto appended claims.

What is claimed as new and desired to be secured by Letters Patent of the United States is:

1. In an airplane ground speed indicator of the type wherein a mirror is rotationally and cyclically swept in the direction of motion of the airplane, so as optically to scan the ground therebeneath over an arc correspondent to and defined by a downwardly-directed aperture in the airplane, a combination direct reading device, including a synchronously driven alternating current motor mechanically coupled to said mirror rotating means in a manner so that the speed of scanning is a direct function of the speed of said motor, and so that alteration of said motor speed entails precisely correspondent and instantaneously effected change of rate of optical scanning, a source of alternating current of energy content sufficient to actuate said motor and to change the speed thereof substantially instantaneously, control means for substantially instantaneously and without lag changing the frequency of said alternating current source to a predetermined one of a series of values, an array of scales, each provided with lines leading to indicia directly denoting rates of ground speed, and each scale corresponding to at least one given altitude of the airplane, a single pointer arranged simultaneously to traverse all said scales, substantially rigid mechanical means coupling said frequency control means and said pointer, whereby pointer movement is a direct function of current frequency, and a single manual control for simultaneously altering said pointer position and said frequency until a ground image in said scanning mirror appears stationary, so that lead lines projected from the intersection of said pointer and a scale representing the instantaneous airplane altitude to said indicia will afford a direct showing of the ground speed of the airplane.

2. A device according to claim 1, in which said means for cyclically sweeping said mirror include a cam driven by said synchronous alternating current motor and a spring-biased contour follower bearing upon the periphery of said cam and coupled so as to move said mirror alternately in two directions, the shape of said cam contour being such that in one direction the angular velocity of the mirror movement is varied proportionately as the line of reflection departs from the vertical of a point directly beneath the airplane towards the horizon, thereby keeping an image which is stationary when the mirror is reflecting vertically, also stationary at angles departing from the vertical.

3. A device according to claim 2, also including electro-mechanical means for substantially instantaneously but temporarily breaking the line of transmission of driving energy between said variable frequency generator and said mirror, whereby the mirror scanning speed is temporarily reduced substantially to zero, and a manual control button for quickly actuating said transmission line breaking means and for substantially instantaneously restoring said transmission line to normal functioning, so that movement of the ground image in the mirror is rendered more easily discernible at times of low observational visibility towards the ground.

CARL DIENSTBACH.

(References on following page)

REFERENCES CITED

The following references are of record in the file of this patent:

UNITED STATES PATENTS

| Number | Name | Date |
|---|---|---|
| 522,820 | Bentley | July 10, 1894 |
| 940,329 | Krell | Nov. 16, 1909 |
| 1,509,167 | Morse | Sept. 23, 1924 |
| 1,579,051 | Alexanderson | Mar. 30, 1926 |
| 1,628,776 | Henderson | May 17, 1927 |
| 1,783,769 | Bates | Dec. 2, 1930 |
| 1,903,886 | Hofe et al. | Apr. 18, 1933 |
| 1,942,536 | Clementi | Jan. 9, 1934 |
| 1,955,746 | Inglis | Apr. 24, 1934 |
| 1,966,850 | Colt | July 17, 1934 |
| 2,027,808 | Carlson | Jan. 14, 1936 |
| 2,162,699 | Chaffee et al. | June 20, 1939 |
| 2,276,284 | Burka | Mar. 17, 1942 |